United States Patent [19]
Horn

[11] 3,995,225
[45] Nov. 30, 1976

[54] SYNCHRONOUS, NON RETURN TO ZERO BIT STREAM DETECTOR

[75] Inventor: Paul Henry Horn, Schaumburg, Ill.

[73] Assignee: Motorola, Inc., Schaumburg, Ill.

[22] Filed: Nov. 13, 1975

[21] Appl. No.: 631,786

[52] U.S. Cl. .................................. 329/106; 329/107; 328/111; 328/119
[51] Int. Cl.² ..................................... H03K 9/08
[58] Field of Search ................... 328/111, 112, 119; 329/106, 107; 307/232, 234

[56] References Cited
UNITED STATES PATENTS

| | | | |
|---|---|---|---|
| 3,271,750 | 9/1966 | Padalino | 329/107 X |
| 3,491,303 | 1/1970 | Gindi | 328/112 |
| 3,597,693 | 8/1971 | McNeilly | 329/106 X |
| 3,601,706 | 8/1971 | Battle et al. | 328/119 |

Primary Examiner—John S. Heyman
Attorney, Agent, or Firm—James W. Gillman; Victor Myer

[57] ABSTRACT

Signals over a data channel are detected for the presence of a non return to zero, psuedo random coded bit stream which is synchronized to a clock frequency and contains submultiple harmonics thereof. The submultiple frequencies occur at discrete integer intervals ranging from ½ to 1/N of the clock frequency, where N is an integer dependent upon the data generation scheme.

The detection system employs an improved quadrature detector which compares narrow width window pulses, derived from the clock signal, which occur in quadrature to the encoded bit stream, with narrow width transition pulses generated at data signal transition time. In response to the synchronous occurrence of a given number of window-transition pulses per time interval, the quadrature detector produces an inhibit signal, thus indicating the absence of a detected data stream.

One system refinement is a minimum bit width detector which produces an inhibit signal if a ½ clock frequency submultiple is not detected within a given time interval.

A further refinement is a maximum bit width detector which produces an inhibit signal upon detecting a number of bits whose width exceeds N/2.

9 Claims, 3 Drawing Figures

SYNCHRONOUS, NON RETURN TO ZERO BIT STREAM DETECTOR

BACKGROUND OF THE INVENTION

This invention pertains to the digital detection art and, in particular, to a means for detecting a synchronous, non return to zero, psuedo random bit stream.

Complex digital bit encoding of information, for example speech, is commonly found in the communication "scrambler" art. In such encoding systems the information is converted to a digital bit stream. In a particularly effective encoding scheme, the information is encoded via a psuedo random process. Here, the bit stream is synchronous to a fundamental clock frequency. The encoding utilizes integer submultiple harmonics of the fundamental clock frequency, which submultiples range from ½ to 1/N of the clock frequency, where N, an integer, is dependent on the particular system chosen. Further encoding may be utilized by generating bits on a non return to zero basis.

By non return to zero, it is meant that if adjoining bits are at the same logic state they are encoded as a continuum rather than returning the signal to zero at the bit's interface.

Complicated data bit stream encoding has required sophisticated decoders. For the psuedo random encoding process, the decoder must first recreate the clock signal and then use the clock to decode the bit stream. Since the encoding process works only off submultiple harmonics of the fundamental clock frequency, it is apparent that any data transition occurring in quadrature with the clock is noise and not information. Thus, the prior art has suggested utilizing a quadrature detector to sense the presence of a received information bit stream. Quadrature detection, by itself, has not yielded an optimum detection technique since the quadrature detectors known in the prior art are severely degraded in low signal to noise conditions, and are subject to "jitter" error, due to their low sensitivity.

Furthermore, in some applications quadrature detection alone does not provide the required detection certainty.

OBJECTS OF THE INVENTION

It is an object of this invention, therefore, to provide an improved decoder for digitally encoded information.

It is a further object of the invention to provide the above described decoder which utilizes a new and improved quadrature detector.

Additionally, it is an object of the invention to provide the decoder and quadrature detector as described above in conjunction with further decoding processing to enhance code detector certainty.

Basically, according to the invention, the quadrature detector processes the clock signal and produces a narrow width "window" pulse therefrom. These window pulses occur at clock transitions which are in quadrature with the encoded bit stream. Similarly, the data signal is processed whereby narrow width transition pulses are generated. The transition pulses occur at the time of received data signal transitions between logic signal states. A comparator senses for the synchronous occurrence of generated window and transition pulses and, in response to detecting such occurrence, produces an inhibit signal. This inhibit signal indicates the absence of a detected bit stream. Since the synchronous detecting operates off narrow width pulses, detection is largely signal to noise independent and free from error due to "jitter".

Detector certainty may be enhanced by further processing the information bit stream through a minimum bit width detector. Since the encoded stream contains submultiples of the clock frequency, there is a given probability of the submultiple ½ occurring within a given time interval. The minimum bit width detector monitors the data signal and produces a second inhibit signal in response to the absence of a ½ submultiple during this interval. Even greater detector certainty may be achieved by incorporating a maximum bit width detector. Since the lowest allowable submultiple frequency is 1/N, the maximum bit length for the encoded bit stream is N/2 clock periods. Thus, the maximum bit width detector monitors the data signal and produces an inhibit signal in response to the detection of data bits which exceed this maximum.

Each inhibit signal may be passed through a logic gate whose output indicates the presence or absence of a detected information bit stream.

DESCRIPTION OF THE PREFERRED EMBODIMENT OF THE INVENTION

Figure 1:
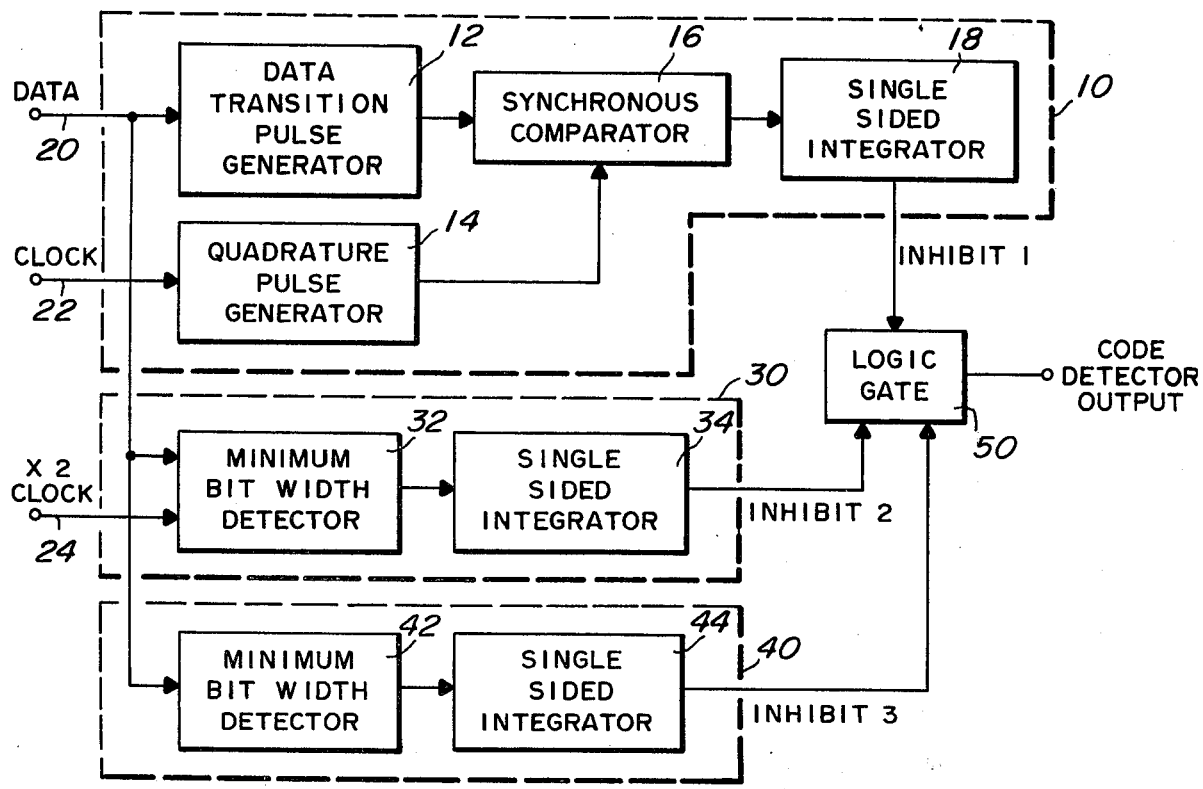
FIG. 1 illustrates a three part decoder, according to the invention, which incorporates the improved quadrature detector along with minimum and maximum bit width detectors.

FIG. 1 illustrates, in block diagram form, the preferred embodiment of a three section synchronous, non return to zero psuedo random type decoder.

The first section 10 is an improved quadrature detector. As mentioned above, since the encoded bit stream contains integer submultiples of the clock frequency, no data transmission may occur in quadrature with the clock. Thus, a data transition occurring in quadrature is interpreted as noise and not information. The quadrature detector 10 is implemented with a data transition pulse generator 12, a quadrature pulse generator 14, a synchronous comparator 16 and a single sided integrator 18.

In operation, information from the data line 20 is fed to the transition pulse generator 12. The transition pulse generator contains circuitry which processes the data signal and generates narrow width "transition" input pulses in response thereto. These transition pulses occur precisely at the time of data signal transitions between logic level states, e.g. between the "zero" and "one" state. The quadrature pulse generator 14 monitors a clock line 22. The clock signal is the fundamental frequency from which the submultiple encoding is derived. In a decoder of this type the clock signal must be recovered at the decoder from the information bit stream. While the means for generating this clock signal is not disclosed herein, such systems are in wide spread use and are well known in the art. Since the information bit stream contains submultiple harmonics of the clock frequency, the clock transition occurring 180° in its cycle corresponds to 90° into a ½ clock frequency submultiple; a clock transition at 360° into the clock cycle corresponds to 90° into a ¼ submultiple, and so on. Thus, clock transitions establish a quadrature relationship with the encoding submultiple frequencies. The quadrature pulse generator 14 processes the clock signal and produces narrow width window pulses in response thereto, the window pulses occurring in a quadrature relationship with a bit stream to be detected.

The synchronous comparator 16 senses the window and transition pulses, and produces an inhibit signal at its output in response to detecting the synchronous occurrence of these pulses. Inhibit pulses from the synchronous comparator 16 are integrated over a predetermined time interval by single sided integrator 18. If a required minimum number of inhibit pulses are generated during the given time interval, integrator 18 produces the first inhibit signal at its output.

The second processing system 30 is comprised of a minimum bit width detector 32 and a single sided integrator 34. Since the encoded bit stream contains the ½ clock frequency submultiple which occurs at a psuedo random rate, there is a given probability that the ½ frequency submultiple occurs within a given time interval. By detecting for the presence of the ½ clock submultiple the overall decoder becomes immune from errors due to tone bursts consisting of a frequency at a clock submultiple which would otherwise be indicated as a valid data stream.

In operation, the minimum bit width detector senses both the data line 20 and a two times clock line 24. The two times clock line 24 connects to circuitry not disclosed herein, but well known in the art, which generates a signal whose frequency is equal to exactly twice the fundamental clock frequency. Since ½ clock frequency is the highest allowable information bit stream frequency, the ½ clock frequency bits are of minimum bit width. The detector 32 produces an output signal for those bits which are equal to the required minimum. A single sided integrator sums the output of detector 32 over a precise time interval, and produces a second inhibit signal output in response to receiving less than a minimum number of detector 32 signals within the given interval.

The final processing chain 40 consists of a maximum bit width detector 42 and a single sided integrator 44. Since the lowest allowable information bit stream submultiple is N/2, the longest allowable data bits are N/2 clock periods long. By detecting for the presence of bits whose length exceeds this maximum, detector operation may be extended down to a low signal to noise ratio, since noise error is most objectionable on the transitions of low frequency inputs.

In operation, the maximum bit width detector 44 senses the data line 20 produces output signals every time a data bit has a length exceeding N/2 clock period. Integrator 44 sums the number of detector 42 outputs over a given time interval, and produces a third inhibit signal output when the summation exceeds a set minimum.

The logic gate 50 monitors each system 10, 30, 40 output and when any output contains an inhibit signal, it activates its output thereby indicating the absence of a detected information bit stream. Thus, gate 50 provides an "OR" function.

Figure 3:
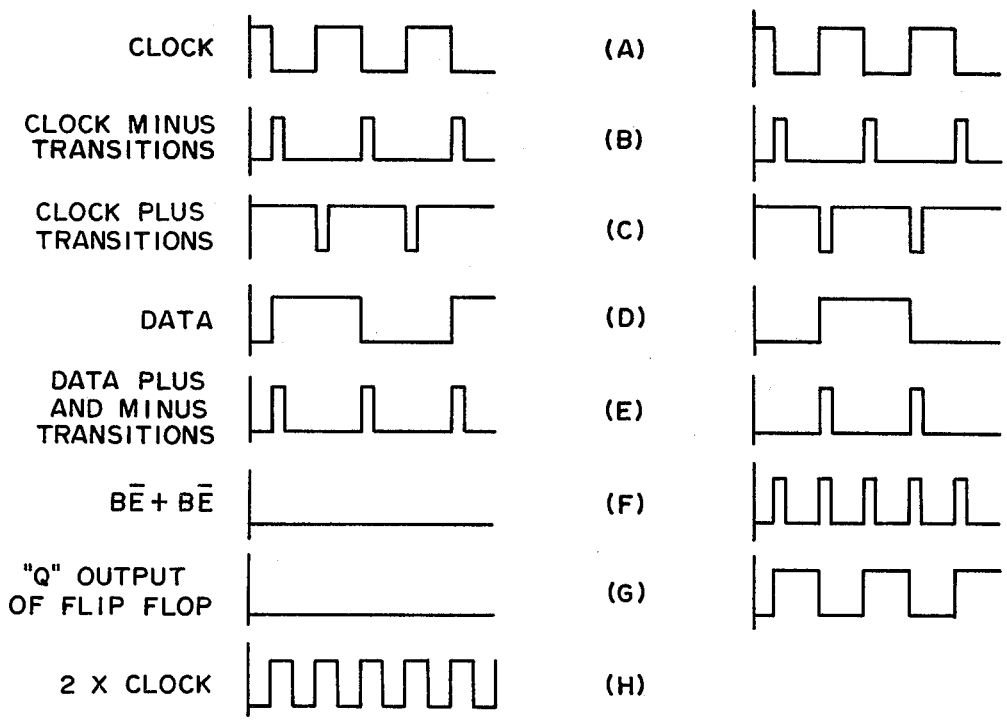
FIG. 3 illustrates the signal waveforms found at various locations in the decoder of FIG. 2.
Figure 2:
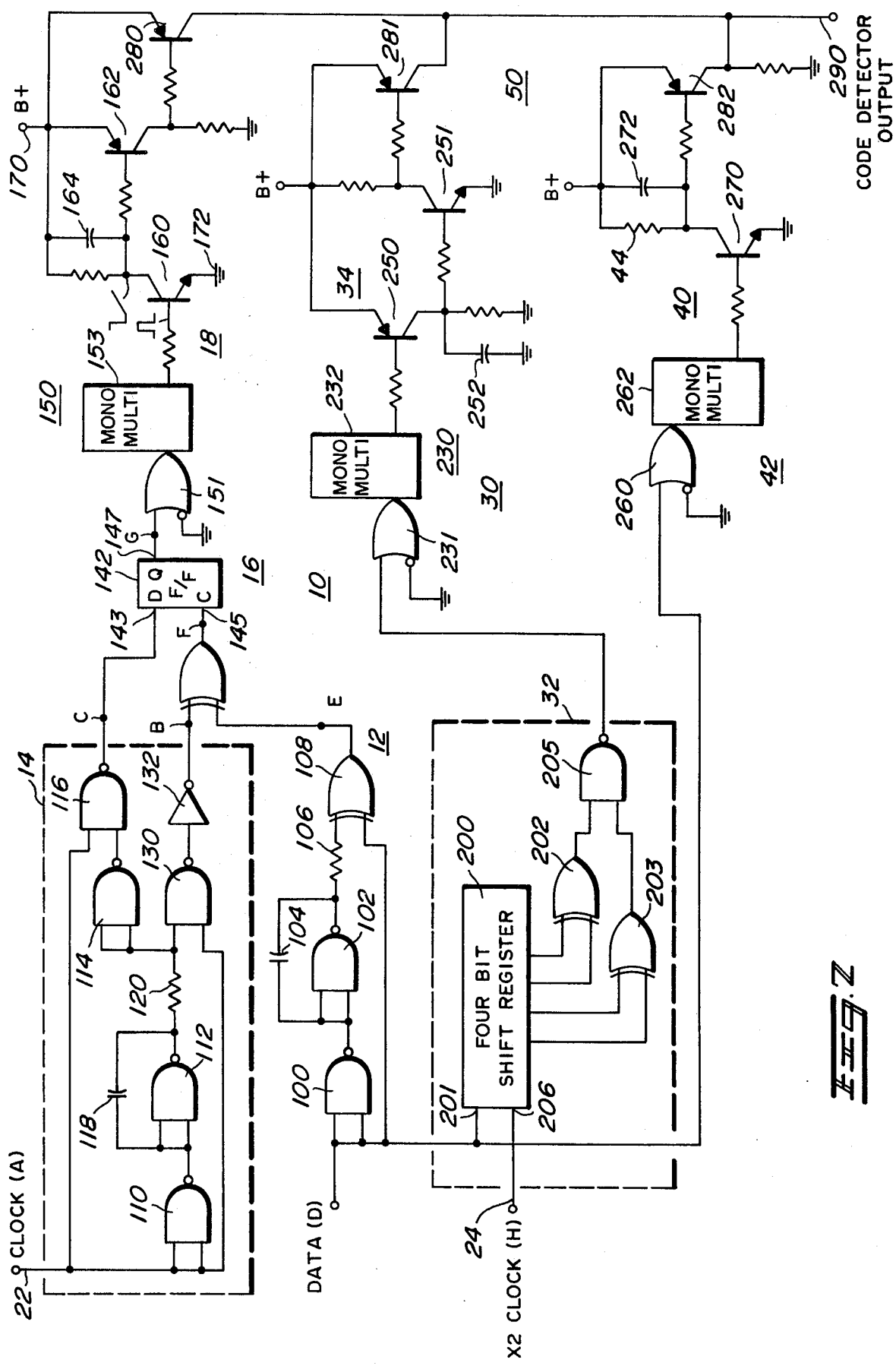
FIG. 2 is a detailed schematic diagram implementing the block diagram of FIG. 1.

The preferred implementation of the diagram of FIG. 1 is illustrated in FIG. 2. FIG. 3 illustrates signal waveforms which appear at indicated points in the full schematic of FIG. 2.

Quadrature detecting is provided via the network 10. The data input (D) is fed via data input line 20 and is processed through a pair of NAND gates 100, 102, a capacitor 104 and a resistor 106 to an exclusive OR gate 108. The output of the exclusive OR is shown as waveform (E), and is seen to consist of a pulse occurring at each data transition.

The quadrature pulse generator 14 processes the clock signal (A) via clock line 22 through a series of NAND gates 110, 112, 114 and 116, a capacitor 118 and a resistor 120 and produces an output waveform (C). Waveform (C) maintains a high output except during clock positive transitions at which time it produces a pulsed low output. NAND gate 130 along with inverter 132 provide output waveform (B) which assumes a low state except at times of negative clock transitions, whereat it produces positive narrow width pulses. Output waveforms (B) and (E) are applied to exclusive OR gate 140 which generates waveform (F). For data which contains an encoded information bit stream, with no jitter, the exclusive OR output (F) remains at a constant level. However, for data consisting entirely of noise, or of jitter, the (F) waveform contains a series of pulses.

Waveform (C) is applied to the D input 143 of a D type flip-flop 142. The clock input 145 of flip-flop 142 connects to waveform signal (F). At its Q output 147 flip-flop 142 produces waveform (G). For data containing an encoded bit stream the (G) output remains at a constant level, whereas for data without the bit stream the (G) output contains a series of pulses. These pulses are processed through a pulse stretcher 150 which consists of an OR gate 151 which triggers a monostable multivibrator 153, whose period is selected to be a suitable pulse length.

The pulse output from the pulse stretcher 150 is applied to the input of a single sided integrator 18. The integrator is comprised of a pair of transistors 160 and 162, an integrating capacitor 164 and a series of bias resistors, all of which interconnect between B+ potential 170 and ground potential 172. A pulse from the pulse stretcher 150 drives transistor 160 to saturation thereby connecting one end of capacitor 164 to ground. At the conclusion of the pulse, transistor 160 is turned off and the voltage across capacitor 164 is very slowly discharged through transistor 162 and its associated resistors. Thus, repetitive pulses from the pulse stretcher 150 maintain a large voltage across capacitor 164 and, therefore, a strong bias on transistor 162 thereby keeping the collector of transistor 162 at a high potential. A high potential at the collector of transistor 162 indicates that the data signal is in quadrature with the clock and, therefore, constitutes the first inhibit to the input of OR gate 50.

For many applications the quadrature detector 10 provides adequate certainty of information bit stream detection. Since the detector senses the synchronous occurrence of two narrow pulses, the system is remarkably free of clock "jitter" problems, and is operable at very low signal to noise ratios.

Decoder certainty may be enhanced with the inclusion of the further processing network 30. Network 30 is comprised of a minimum bit width detector 32 and single sided integrator 34. Minimum bit width detector 32 is comprised of a four bit shift register 200, a pair of exclusive OR gates 202, 203 and a NAND gate 205. The four bit shift register 200 has a data input 201 and a clock input 206. The data input connects on the data line 20, whereas the clock input connects to circuitry for generating the signal (H), which is at twice the clock frequency.

Data bits are clocked into the register 200 at a rate equal to twice the clock frequency. The shift register outputs are processed through the gates 202, 203 and 205 which provide the logic function:

$$F = \overline{(A + B) \cdot (C + D)},$$

where A, B, C, and D are the shift register's four bit inputs, and F is the logic output state. Since the condition of "F" is false only when $A = \overline{B}$ and $C = \overline{D}$, the detector 32 generates output pulses for data consisting of bits which occur at ½ the clock frequency, i.e. for shift register 200 outputs which follow the sequence 0-1-1-0 or 1-0-0-1.

An output pulse from detector 32 indicates the presence of an information bit stream. These pulses are, in turn, stretched in pulse stretcher 230 which is comprised of an OR gate 231 which fires a monostable multivibrator 232. The pulse stretcher output feeds to a single sided integrator 34 comprised of transistors 250, 251 along with integrating capacitor 252 and corresponding bias resistors. Integrator 34 provides the complementary function of integrator 18, since pulses from pulse stretcher 230 indicate the presence of the bit stream, whereas the output from pulse stretcher 150 indicates the absence of the bit stream. Thus the collector of transistor 251 assumes a high voltage for the absence of pulses from pulse stretcher 230, thereby providing the second inhibit signal, which also feeds to the OR gate 50.

Additional detector certainty may be achieved with the inclusion of network 40. Network 40 includes a maximum bit width detector 42 and a single sided integrator 44. The maximum bit width detector 42 is comprised of an OR gate 260 which triggers a monostable multivibrator 262. The OR gate 260 senses the data line 20, and triggers the monostable 262 upon data transitions. If the data is at a sufficiently high frequency, the monostable 262 remains triggered. By appropriate selecting of timing components in monostable 262, it is continuously triggered for those frequencies corresponding to the submultiple 1/N of the clock frequency. Thus, the consistent triggering of monostable 42 indicates that an information bit stream is received. The output of the maximum bit width detector 42 is single sided integrated by integrator 44 to provide extra "falsing" protection. Integrator 44 is comprised of a transistor 270 along with an integrating capacitor 272 and corresponding bias resistors. The output from the collector of transistor 270 provides a third inhibit signal for input data which exceeds the maximum bit width detector 42. This output, in turn, is fed to OR gate 50.

OR gate 50 is comprised of transistors 280-282 connected in an open collector type configuration to provide the final code detector output 290. Thus, when the OR gate 50 receives any inhibit signals, its output assumes a high state. Otherwise, the output 290 is at a low state. In a complete decoding system, the code detector output 290 indicates to subsequent circuitry whether or not an information bit stream is present.

In summary, an improved detector for digitally encoded information has been disclosed which employs an improved quadrature detector. The improved quadrature detector may be combined with additional decoding processing networks to further increase detector certainty.

While a preferred embodiment of the invention has been described in detail, it should be understood that many modifications and variations thereto are possible, all of which fall within the true spirit and scope of the invention.

I claim:

1. A system for detecting the presence of an information bit stream in a received data signal, said bit stream being synchronous to a predetermined period clock signal and at a submultiple frequency thereof, the improvement comprising:

first means for processing the clock signal and generating narrow width window pulses in response thereto, said window pulses being in quadrature with the bit stream to be detected;

second means for processing the data signal and generating narrow width transition pulses in response thereto, said transition pulses being generated at the time of data signal transitions between signal states; and comparator means for processing generated window pulses and transition pulses and producing a first inhibit signal in response to the synchronous occurrence thereof, whereby said first inhibit signal indicates the absence of a detected bit stream.

2. The system of claim 1 wherein the bit stream contains discrete integer submultiples of the clock frequency, the highest submultiple at ½ the clock frequency, the improvement further comprising a minimum bit width detector means for detecting the presence of a ½ clock frequency submultiple signal in the data signal within a predetermined time period and producing a second inhibit signal in response to the absence in detection thereof, whereby said second inhibit signal indicates the absence of a detected bit stream.

3. The system of claim 2 wherein the lowest bit stream clock frequency submultiple is 1/N where N is predetermined integer, the improvement further comprising maximum bit width detector means for detecting data signal bits whose length exceeds N/2 clock periods and producing a third inhibit signal in response to the detection thereof, whereby said third inhibit signal indicates the absence of a detected bit stream.

4. The system of claim 3 wherein the improvement further comprises logic means assuming a first output state responsive to the production of either first, second, or third inhibit signals, said logic means otherwise assuming a second output state, whereby the logic means assuming the second output state indicates bit stream detection.

5. The system of claim 1 wherein the comparator means further comprises means for integrating the number of synchronous window pulse/transition pulses occurrences over a predetermined time interval and producing the first inhibit signal in response to a minimum number of synchronous occurrences per interval.

6. The system of claim 2 wherein the minimum bit width detector means comprises means for integrating the number of detected ½ clock frequency submultiple signals occurring over a predetermined time interval and producing the second inhibit signal in response to a minimum number of such detections per interval.

7. The system of claim 3 wherein the maximum bit width detector comprises
   means for integrating the number of detected data bits whose length exceeds N/2 over a predetermined time interval and producing the third inhibit signal in response to a minimum number of such detections per interval.

8. A system for detecting the presence of an information bit stream in a data signal, said bit stream being synchronous to a clock signal and at submultiple frequencies thereof, the highest submultiple at ½ clock frequency and the lowest submultiple at 1/N clock frequency, where N is an integer, the system comprising:
   quadrature detection means for processing the clock signal and data signal and producing a first inhibit signal in response to the detection of a quadrature relationship therebetween;
   minimum bit width detector means for processing the clock signal and data signal and producing a second inhibit signal in response to the absence of a ½ clock submultiple frequency within a predetermined time period; and
   logic gate means assuming a first output state upon production of either a first or second inhibit signal, the gate otherwise assuming a second output state, whereby the logic gate assuming the second state indicates the detection of said information bit stream.

9. The system of claim 8 further comprising
   maximum bit width detector means for processing the data signal and producing a third inhibit signal responsive to the detection of a predetermined number of bits whose width exceeds N/2 occurring within a predetermined time interval
   and wherein the logic gate means assumes the first output state upon production of either a first, second, or third inhibit signal.

* * * * *